United States Patent [19]
West

[11] Patent Number: 5,342,438
[45] Date of Patent: Aug. 30, 1994

[54] REMEDIAL WOOD PRESERVATIVE

[76] Inventor: Michael H. West, Rte. 2, Box 253F, Senatobia, Miss. 38668

[21] Appl. No.: 184,939

[22] Filed: Jan. 24, 1994

Related U.S. Application Data

[63] Continuation-in-part of Ser. No. 13,433, Feb. 4, 1993, abandoned.

[51] Int. Cl.$^5$ .................. C09D 15/00; C09K 15/32
[52] U.S. Cl. .................. 106/18.3; 106/15.05; 106/18.32; 252/381; 252/383; 252/385; 424/630; 424/657; 424/660; 514/499; 514/500; 514/579
[58] Field of Search ............... 252/381, 383, 384, 385; 106/15.05, 18.3, 18.32; 424/630, 657, 660; 514/500, 579

[56] References Cited

U.S. PATENT DOCUMENTS

| | | | |
|---|---|---|---|
| 4,661,157 | 4/1987 | Beauford et al. | 106/18.3 |
| 4,759,872 | 7/1988 | Marx et al. | 106/18.32 |
| 5,078,912 | 1/1992 | Goettsche et al. | 252/400.1 |

*Primary Examiner*—Anthony Green

[57] ABSTRACT

This invention discloses a non-water dilutable remedial wood preservative containing ½ to 10 parts copper derived from amine-inorganic copper complexes, combined with sodium borate or sodium fluoride, or a combination thereof, in a ratio of 2 to 120 parts of the sodium salt for each part of copper in the preservative. This invention also discloses the improvement in copper penetration into the wood which occurs when the amine-inorganic copper complexes are combined with sodium borate and/or sodium fluoride, and a novel method of thickening these compositions.

3 Claims, No Drawings

REMEDIAL WOOD PRESERVATIVE

This application is a continuation-in-part of Ser. No. 08/013,433, filed on Feb. 4, 1993, and which is now abandoned.

TECHNICAL FIELD

This invention relates to compositions for the supplemental or remedial treatment of wood in place.

BACKGROUND OF THE INVENTION

Utility poles and railroad cross ties are normally pressure treated with toxic preservative compositions such as creosote or pentachlorophenol dissolved in oil. These toxic ingredients penetrate thru most of the sapwood portion of the article, but seldom penetrate the heartwood. These pressure treated commodities last up to 30 years without supplementary treatment, but there is frequently a small percentage of early failures.

Supplementary or remedial treatments can be used to materially increase the useful life of poles and ties. Poles show early failure due to light or shallow treatment, failure to destroy internal decay organisms present in the article at the time of pressure treatment, checking or cracking which allows entry of either decay or insects into untreated heartwood, and/or leaching of the initial preservative from the groundline area. Ties most often are attacked under the tie plate due to entry of deterioration organisms into the untreated heartwood thru the spike holes and because of moist conditions under the tie plate.

Most remedial treatments are made by external application. Successful preservation requires 1/16" to ⅛" application of the preservative to the wood surface. Paste or grease type compositions have been developed which adhere to the wood in these thicknesses. These compositions must release the preservative actives into the wood to be effective, and these actives must quickly penetrate to the site of infection to prevent wood strength loss. One or more of the preservative actives should fix in the wood to discourage future infection.

A good determination of whether a remedial preservative is releasing its active ingredients into the wood can be made by taking borings from the wood and checking for chemical penetration. The release of actives into the wood should be swift; otherwise leaching and erosion may remove the preservative from the wood surface and flush much of it into the surrounding soil.

Most external remedial treatments are made to poles at the groundline by brushing on the preservative and covering the treated area with a plastic or coated paper wrap. External remedial treatments are made to ties by application under the plate. Poles are internally treated by inserting a paste, rod, or liquid in holes drilled as close as possible to areas of suspected internal deterioration.

One researcher has described remedial preservatives as those which often include two or more active ingredients which differ substantially in capability for diffusion thru wood. One component is usually quite mobile whereas the other is less or slightly mobile. Historically, remedial preservatives have contained oil based preservatives such as pentachlorophenol or creosote as the slightly mobile component. Copper naphthenate has recently found favor in replacing the more hazardous pentachlorophenol and creosote. U.S. Pat. No. 4,661,157 teaches the use of shaped alkaline earth metal borates for remedial treatment; however, these chemicals alone are not sufficiently permanent in the wood to provide long term protection for poles and ties. Sodium fluoride is also a well known mobile component of wood preservatives.

U.S. Pat. No. 5,078,912 discloses the use of amine-inorganic copper complexes for preserving solid wood when said complexes are diluted from about 1 to 5 percent in water and applied by pressure treatment. No one has proposed amine-inorganic copper complexes for use as the less mobile component in remedial wood preservative compositions. The most compelling reason why these complexes have not been considered is this: remedial preservative components which fix and are most permanent in the wood have always been oil based. No one skilled in the art has proceeded beyond this conventional reasoning.

Conventional thinking also indicates that a water soluble component, such as amine-inorganic copper complexes, will not penetrate poles and ties previously treated with creosote or pentachlorophenol in oil. It is also known that alkaline copper complexes are neutralized by wood acids. The ones which fix in the wood become insoluble upon neutralization, and resist further penetration as effectively as they resist leaching. Also, no economical technology for the thickening of amine-inorganic complexes has been proposed. This is another reason why they have not been considered for use in remedial wood preservatives.

SUMMARY OF THE INVENTION

My invention consists of the preparation of non-water dilutable wood preservative compositions which quickly penetrate wood. These can be described as containing ½ to 10 parts copper, derived from amine-inorganic copper complexes, combined with sodium borate, sodium fluoride, or a combination thereof, in a ratio of two to 120 parts of the sodium salt for each part of copper in the composition.

It additionally consists of the discovery that the compositions described above give better penetration of copper thru wood than amine-inorganic copper complexes used without the sodium salts.

It further consists of the discovery of an economical method for thickening amine-inorganic copper complexes using sodium borate and/or sodium fluoride, and a thickening clay.

DETAILED DESCRIPTION OF THE INVENTION

Methods for preparing amine-inorganic copper complexes may be found in U.S. Pat. No. 4,098,602. I have found that good quality complexes may be prepared in situ with the other ingredients of my remedial wood preservative compositions by simple blending.

Inorganic copper materials I have found suitable for the practice of the current invention include copper hydroxide, basic copper carbonate, and copper sulfate. Amines I have found suitable include monoethanolamine, monoisopropanolamine, diethanolamine, and triethanolamine. The preferred sodium borate is sodium tetraborate decahydrate. The preferred thickening clay is ATTAGEL 350 marketed by the Englehard Corporation.

Copper containing wood preservatives are normally characterized by their copper content, and copper raw materials are sold based on their copper content. The copper content of any composition can be determined by multiplying the parts of copper raw material in 100 parts of the preservative by the percent copper in the copper raw material. My compositions are best described as containing a specific number of parts copper derived from amine-inorganic copper complexes. Other descriptions of amine-inorganic copper complexes are difficult because they can contain different amines, different inorganic copper compounds, and various ratios of amine to copper. The non-copper components are best referred to in their ratio to the copper present.

One of the aspects of my invention is the improved copper penetration thru wood achieved when amine-inorganic copper complexes are combined with sodium borate and/or sodium fluoride. This combination also leads to easier thickening for use in external remedial wood treatment. This is another aspect of the invention; without the sodium salts the compositions described are liquid.

The following examples illustrate the compositions, their preparation, application as remedial preservatives, the swift movement of the active ingredients into poles and ties, and the reduced penetration thru wood when the sodium salts are omitted. All my compositions are non-water dilutable; if water is added, they become physically unsuitable for remedial wood treatment.

EXAMPLE 1

A paste composition was prepared by blending together in the order listed: 33.0 parts water, 3.5 parts copper hydroxide (57% Cu), 6.0 parts monoethanolamine, 40.0 parts sodium tetraborate decahydrate, and 17.5 parts ATTAGEL 350 clay thickener. This preservative contained 2 parts copper derived from amine-inorganic copper complexes, and 40 parts sodium salt for a ratio of 1 part copper to 20 parts sodium salt.

This paste was brushed to 21" of the groundline vertical surface area of an aged pine pole and wrapped with nylon sheeting. After two weeks borings were taken from the treated section of the pole and analyzed. Both copper and borax had penetrated more than ½" into the pole.

EXAMPLE 2

A paste composition was prepared by blending together in the order listed: 25.0 parts water, 7.3 parts basic copper carbonate (55% Cu), 15.0 parts monoisopropanolamine, 40.0 parts sodium fluoride, and 12.7 parts ATTAGEL 350 clay. This preservative contained 4 parts copper derived from amine-inorganic copper complexes and 40 parts sodium salt for a ratio of 1 part copper to 10 parts sodium salt.

Using a grease gun, the paste was pushed into ¼" holes drilled 6" deep into an aged pine pole, and the holes were plugged. After two weeks wood borings were taken ½" distant from the holes It was determined analytically that both copper and sodium fluoride had penetrated into these borings.

EXAMPLE 3

A paste composition was prepared by blending together in the order listed: 35 parts water, 4 parts copper sulfate pentahydrate (25% Cu), 6 parts triethanolamine, 20 parts sodium tetraborate decahydrate, 20 parts sodium fluoride, and 15 parts ATTAGEL 350 clay. This preservative contained 1 part copper derived from amine-inorganic copper complexes and 40 parts sodium salt for a 1 to 40 ratio.

The paste was brushed to a ¼" thickness on the tie plate area of an aged cross tie. When the plate was placed over the paste preservative, it remained in position. After two weeks the plate was removed and wood borings were taken. It was determined that borax, sodium fluoride, and copper had penetrated at least ½" into the tie.

EXAMPLE 4

A paste composition was prepared by blending together in the order listed: 23.0 parts water, 3.5 parts copper hydroxide (57% Cu), 10.0 parts monoethanolamine, 40.0 parts sodium tetraborate decahydrate, 15.0 parts tall oil fatty acids, and 8.5 parts of ATTAGEL 350 clay. This preservative contained 2 parts copper derived from amine-inorganic copper complexes and 40 parts sodium salt for a 1 to 20 ratio.

The paste was applied to polyethylene coated kraft paper cut to 21" wide. Using a wooden form and wooden blade, the preservative was spread evenly to a ⅛" thickness. When the paper was moved and held vertically, the paste did not drop off.

This remedial treatment was wrapped around the groundline area of an aged pine pole. After two weeks the paper was removed, and wood borings were taken. It was determined that copper and borax had penetrated more than ½" below the pole surface.

EXAMPLE 5

A paste composition was prepared by blending together in the order listed: 23.0 parts water, 10.5 parts copper hydroxide (57% Cu), 23.5 parts diethanolamine, 10.0 parts sodium tetraborate decahydrate, and 33.0 parts ATTAGEL 350 clay. This preservative contained 6 parts copper and 10 parts sodium salt for an approximate ratio of 1 part copper to 2 parts sodium salt. This copper can be described as derived from amine-inorganic copper complexes because diethanolamine has complexed the copper hydroxide and made it soluble.

The paste was troweled to a ½" thickness over the tie plate area of an aged cross tie. The tie plate was not used. After two weeks borings were taken from the treated area. It was determined that copper and borax had penetrated ¼" below the tie surface.

EXAMPLE 6

A paste composition was prepared by blending together in the order listed: 45.0 parts water, 3.5 parts copper hydroxide (57% Cu), 15.0 parts monoethanolamine, 22.0 parts disodium octoborate tetrahydrate, and 14.5 parts ATTAGEL 350 clay.

This paste was troweled ¼" thick on the bottom 2 feet of the surface area of a freshly cut and peeled elm tree section. After three days the copper had visibly moved up the section more than 6" from the preservative application.

EXAMPLE 7

The compositions in Examples 1 thru 5 were prepared omitting the sodium salts and replacing them with an equal weight of water. These new preparations were liquid and unsuitable for external remedial preservation.

EXAMPLE 8

Ten 2 foot sections of a growing oak tree were cut, and one ¼" hole drilled at a 90° angle to the bark surface 6 " deep in the middle of these sections. Each composition from Examples 1-5, and Example 7 were used to fill a hole in one of the sections. The holes were then plugged.

The sections were placed on end in an outdoor location. After two weeks the top ends were examined. Only the sections treated with compositions containing the sodium salts were blue-green in color, indicating copper movement to the top surface of those red oak sections. This increase in copper penetration, due to the presence of the sodium salts in the formulations, was confirmed using Chrome Azurol S indicator solution according to American Wood Preserver's Association's A 3 instructions.

EXAMPLE 9

A paste composition was prepared by blending together in the order listed: 30.0 parts water, 0.9 parts copper hydroxide (57% Cu), 2.1 parts monoethanolamine, 60.0 parts sodium tetraborate decahydrate, and 7.0 parts MIN-U-GEL 400 Attapulgite clay. This preservative contained ½" part copper derived from amine-inorganic copper complexes and 60 parts sodium salt for a ratio of 1 part copper to 120 parts sodium salt.

This paste was brushed or troweled smoothly and adhered to wood, plastic, and coated paper in thicknesses up to ½". Like the other compositions of my invention, it was not water dilutable.

EXAMPLE 10

The composition of Example 9 was again made without adding any Attapulgite clay. This composition was still a paste; however, the liquid portion tended to separate from the solid portion. It would not brush or trowel smoothly, and it would not acceptably adhere to wood, plastic, or coated paper. It was deemed unacceptable for external remedial treatment of wood.

EXAMPLE 11

A paste composition was prepared by blending together in the order listed: 22.5 parts water, 17.5 parts copper hydroxide (57% Cu), 30.0 parts monoethanolamine, 25.0 parts sodium tetraborate decahydrate, and 5.0 parts MIN-U-GEL 400 Attapulgite clay. This preservative contained 10 parts copper derived from amine-inorganic copper complexes and 25 parts sodium salt for a 1 to 2.5 ratio.

This composition was slurried together with an equal weight of water and filtered. The blue color of the filtrate indicated the presence of water soluble amine-inorganic copper complexes. The filtrate was analyzed for copper with positive results.

EXAMPLE 12

The compositions of Example 9 and 11 were prepared, replacing the sodium salt with an equal weight of water. These, along with the compositions from Examples 9 and 11, were tested as in Example 8.

After two weeks only the sections treated with compositions containing the sodium salts were blue-green in color, indicating copper movement to the top surface of those red oak sections. This increase in copper diffusion due to presence of the sodium salts was confirmed using Chrome Azurol S indicator solution according to American Wood Preserver's Association's A3 instructions.

EXAMPLE 13

It has been taught that borates and fluorides may be used with amine-inorganic copper complexes up to 50% by weight in water dilutable formulations for solid wood preservation by pressure processes. To determine if barium metaborate and calcium fluoride improve the copper penetration into wood of my non-water dilutable compositions, the composition of Example 1 was prepared using calcium fluoride in one instance and barium metaborate in a second instance to replace the sodium tetraborate decahydrate. The two new compositions were tested following the procedure outlined in Example 8.

After two weeks no copper was present on the tops of the red oak sections treated with the new compositions. These sections were cut one inch from the chemical application site and tested for fluoride in one instance and boron in the second instance. The tests were negative for fluoride and boron.

EXAMPLE 14

It has been taught that up to 50% by weight of a fungicidal anion may be used with amine-inorganic copper in water dilutable formulations for solid wood preservation by pressure processes. To determine if the sodium salt of 8-hydroxyquinoline (a salt of a fungicidal anion) affects the copper penetration into wood of my non-water dilutable compositions, the composition of Example 3 was prepared replacing the sodium fluoride and sodium tetraborate decahydrate with the sodium salt of 8-hydroxyquinoline. Then this composition was tested in the same manner as in Example 3.

After two weeks testing of wood borings confirmed that no copper had penetrated below the surface of the cross tie. In a further test five grams of this new composition was slurried with twenty-five grams of water and filtered. Analysis confirmed that water soluble copper was not present.

I claim:

1. A non-water dilutable remedial wood preservative composition containing ½ to 10 parts copper derived from amine-inorganic copper complexes, combined with at least one sodium salt selected from the group consisting of sodium borate and sodium fluoride in a ratio of 2 to 120 parts of the sodium salt for each part of copper in the preservative.

2. A method for improving the non-pressure wood penetration properties of a wood preservative comprising amine-inorganic copper complexes which consists of combining said complexes with at least one sodium salt selected from the group consisting of sodium borate and sodium fluoride in a ratio of from 2 to 120 parts sodium salt for each part of copper present in said wood preservative.

3. A method for thickening a wood preservative composition containing amine-inorganic copper complexes into a paste suitable for external remedial wood preservation which consists of blending the copper complexes with at least one sodium salt selected from the group consisting of sodium borate and sodium fluoride in a ratio of 2 to 120 parts sodium salt for each part copper and with a clay thickener in a ratio of ½ to 15 parts for each part copper present in said wood preservative composition.

* * * * *